United States Patent [19]

Piet et al.

[11] 4,243,069
[45] Jan. 6, 1981

[54] FLUID FLOW REGULATOR

[75] Inventors: Meyer Piet; James J. Castor, both of City of Industry, Calif.

[73] Assignee: Futurecraft Corporation, City of Industry, Calif.

[21] Appl. No.: 51,050

[22] Filed: Jun. 22, 1979

[51] Int. Cl.³ .......................................... F16K 17/34
[52] U.S. Cl. .................. 137/484.6; 137/505.18; 137/505.26
[58] Field of Search ............... 137/484.2, 484.4, 484.6, 137/484.8, 505.18, 505.26

[56] References Cited
U.S. PATENT DOCUMENTS

| | | | |
|---|---|---|---|
| 2,566,773 | 9/1951 | Otis | 137/486 |
| 2,690,758 | 10/1954 | Lee | 137/484.8 X |
| 2,754,185 | 7/1956 | Ensign | 137/505.26 X |
| 3,358,964 | 12/1967 | Cohen | 137/505.18 X |

*Primary Examiner*—Harold W. Weakley
*Attorney, Agent, or Firm*—James E. Brunton

[57] ABSTRACT

A precision fluid flow regulator for liquid and gaseous applications necessitating reduction of high inlet pressures and requiring precise control of outlet flow rates and pressures. The device includes a large pressure port and a cooperating pressure port closure means having a large pressure sensing area. Embodied internally of the unit is a novel sensing means for accurately sensing outlet flow rates and pressures and for providing instantaneous response to flow rate changes.

12 Claims, 3 Drawing Figures

FLUID FLOW REGULATOR

BACKGROUND OF THE INVENTION

1. Field of the Invention

The present invention relates generally to fluid flow regulators and more particularly to a novel high fluid flow rate regulator which embodies a unique arrangement for real time sensing of outlet flow rates and pressures and for providing a extremely rapid response to any small changes in the rate of flow of fluid through the outlet of the device.

2. Discussion of the Prior Art

Various types of fluid flow regulators have been suggested in the past. Generally these regulators comprise a casing having a fluid inlet and a fluid outlet, a pressure port disposed between the inlet and outlet, and a piston movable within the casing in response to fluid pressure exerted thereon. When fluid pressure is applied to the pressure sensing face of the piston it will move into a port closing position against the urging of a spring. When the piston is in a port open position, fluid flows from the inlet, through the pressure port and outwardly through the outlet at a predetermined reduced pressure. Typically a portion of the fluid at a predetermined reduced pressure flowing through the outlet passage of the regulator is redirected through one or more small bores or pressure pick-ups formed in the walls of the outlet passageway. This fluid then flows through a conduit interconnecting the small bores with a pressure chamber which is located between a wall of the casing and the pressure sensing face of the movable piston. This redirected fluid impinges upon the piston face, which often is relatively small, and urges the piston in a direction toward a port closing position. In this way the device regulates the fluid flow through the regulator. The pressure pick-up bores formed in the outlet passageway of the prior art regulators generally extend radially outwardly at right angles to the direction of flow of the fluid.

In applications wherein fluid pressures and flow values are relatively low and where precise control of outlet flow rates is unnecessary, prior art devices of the aforementioned character preform satisfactorily. However, in high pressure, high volume applications requiring precise and instantaneous control of fluid flow rates, such prior art devices are unacceptable. Specific drawbacks of these prior art fluid flow regulators include relatively small pressure ports, small pressure sensing faces on the reciprocating pistons of the devices and poor pressure pick-up locations and configurations. For example, radially extending pressure pick-up bores located in the outlet passage of the regulator, as found in many prior art devices, have several disadvantages. Such configurations encourage detrimental aspiration effects, cause difficulties in calibration and markedly contribute to slow response times.

As will become apparent from the discussion which follows, the unique design of the fluid flow regulator of the present invention effectively overcomes the drawbacks of the prior art devices. The regulator of the present invention has both a large pressure port and a large cooperating port closure means presenting a large pressure sensing face. Further, the regulator embodies a highly novel ram pressure pick-up arrangement. These unique features combine to produce a precision regulator capable of accommodating high pressures and high fluid flow rates while at the same time providing very accurate and virtually instantaneous response to very small outlet flow rate changes.

Applicants are familiar with a line of fluid flow regulators manufactured by the Futurecraft Corporation of City of Industry, California, which regulators are illustrated in a catalog published by said Company and which represent the most pertinent art known to applicants.

SUMMARY OF THE INVENTION

It is an object of the present invention to provide a fluid flow regulator for liquid and gaseous applications which will accommodate large fluid flow rates and will provide virtually instantaneous response to changes in the rate of fluid flow from the outlet of the device.

It is another object of the invention to provide a regulator of the aforementioned character which is capable of accommodating inlet pressures of on the order of 5000 pounds per square inch (psi) which permits high volume fluid flow through a large pressure port and which accurately and reproducably controls outlet pressures of on the order of a few hundred psi.

It is another object of the invention to provide a regulator as described in the preceeding paragraphs which embodies a positive acting port closure means for closing the pressure port, said means having a large pressure sensing area.

It is still another object of the invention to provide a regulator of the character previously described which includes a unique positive action sensing, or fluid diverting, means disposed in the outlet passage of the device for diverting a precisely determinable portion of the fluid flowing therethrough and directing it toward the pressure sensing face of the port closure means.

More particularly it is an object of the invention to provide such a fluid diverting means which will not aspirate and one which is directly interposed into the path of the fluid flow whereby flow rate variations in the outlet passage can be anticipated so as to permit real time, instantaneous response to changes in flow rate.

It is a further object of the invention to provide a regulator of the aforementioned character which is safe, highly compact, embodies a minimum number of component parts and can be inexpensively manufactured, calibrated and tested.

In summary, these and other objects of the invention can be achieved by a fluid flow regulator comprising a body having an axial opening and including a fluid inlet passage and an axially spaced fluid outlet passage interconnected with the axial opening; pressure port means in the axial opening between the inlet and outlet passages; a slide member receivable in the axial opening for axial movement therewithin in response to fluid pressure exerted thereon; biasing means operably associated with the slide member for yieldably resisting movement thereof within the axial opening; port closure means carried by the slide member for closing the pressure port means upon movement of the slide member within the opening; and fluid diverting means disposed within the outlet passage for diverting a portion of the fluid flowing therethrough and directing it toward the slide member, the fluid diverting means comprising a first conduit means defining a fluid flow path substantially parallel to the direction of flow of the fluid within the outlet passageway for capturing a portion of the fluid flowing through the outlet passageway.

DESCRIPTION OF A PREFERRED FORM OF THE INVENTION

Figure 1:
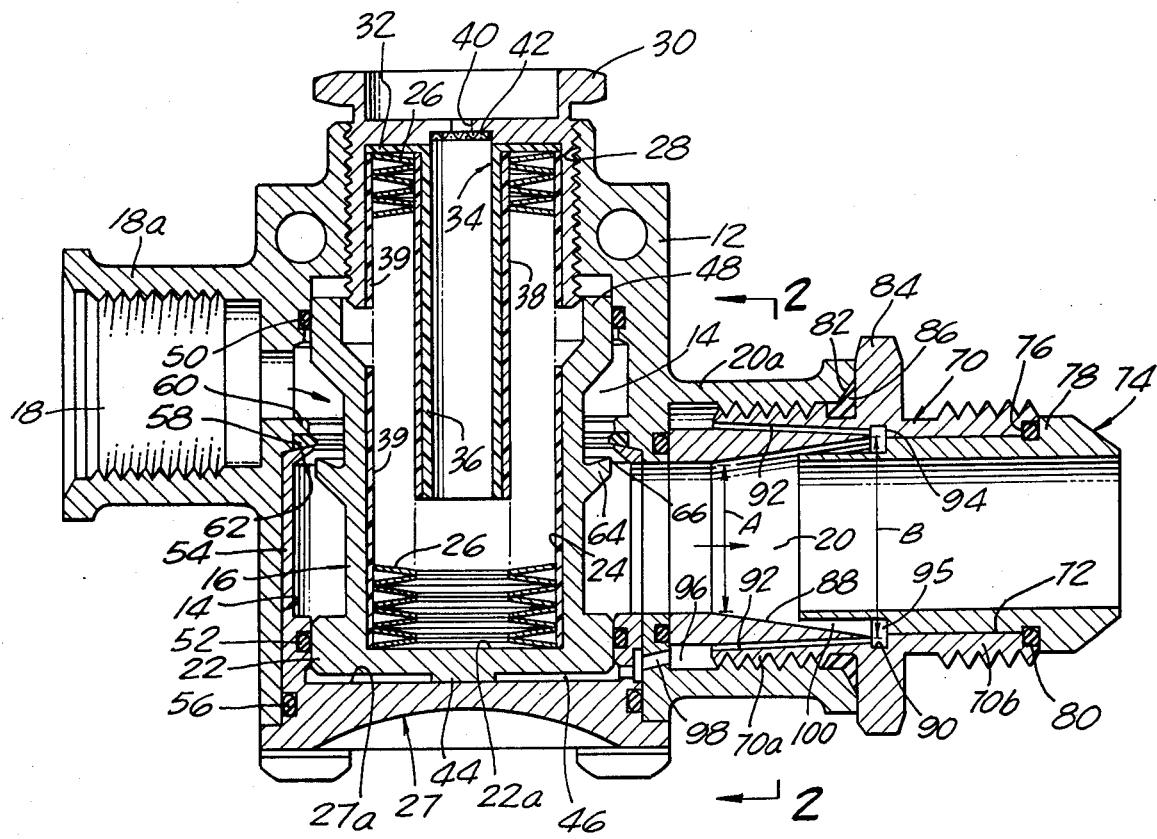
FIG. 1 is a side elevational cross-sectional view of the regulator of the present invention.

Referring to the drawings, the preferred form of the pressure regulator of the invention includes a body 12 having an axial opening 14 in which a slide member, or poppet 16 is operative. The body 12 has a laterally directed inlet, or pressure passage 18 and a laterally directed outlet or service passage 20 spaced along the axis of opening 14 of body 12 and in communication therewith. These passages are formed by walls 18a and 20a respectively which are threaded as shown for connection to piping or mating couplings.

Slide member 16 is generally round in cross-section and has at its lower end an integrally formed base portion 22. A central bore 24 formed in member 16 is adapted to receive a biasing means, shown here as comprising a bellville spring 26.

Body 12 is closed at its lower end by a lower cap member 27 which is closely receivable within axial opening 14. At its upper end, body 12 is provided with a threaded opening 28 adapted to threadably receive an upper cap 30. Cap 30 which closes the upper end of body 12, is counter bored to closely receive the upper flange portion 32 of an elongated generally cylindrical bushing 34, the body portion 36 of which extends axially of opening 14 formed in body 12. Receivable over body portion 36 of bushing 34 is a sleeve 38 which is adapted to extend axially of, and to be slidably engaged by, spring 26. Sleeve 34 is preferably formed of teflon or other suitable low friction material. A vent aperture 40 is provided in cap 30. Aperture 40 is in communication with axial opening 14 of body 12 through a porous screen element 42 designed to prevent contaminates from inadvertently entering the regulator body through aperture 40.

Referring to FIG. 1, when the regulator is in its operative configuration as there illustrated, the lower extremity of spring 26 is in engagement with the inner surface 22a of base portion 22 and the upper extremity is in engagement with flange 32 of bushing 34. Bushing 34 along with sleeve 38 functions as a guide means and maintains the spring in axial alignment within axial opening 14 of body 12. An outer sleeve 39 constructed of teflon, or like material, is provided to guidably engage the outer surfaces of spring 26. With this arrangement slide member 16 is continuously biased toward lower cap 27 and against upward movement within body 12.

It is to be noted that when slide member 16 is in the downward most position shown in FIG. 1, a central boss portion 44 engages the upper surface 27a of lower cap 27. This creates a fluid pressure chamber in the form of an annular space 46 located between the lower surface of the slide member and the upper surface of cap 27.

Formed proximate the upper end of slide member 16 is a radially outwardly extending circumferential flange portion 48 which, upon upward movement of the slide member, is slidable in an O-ring 50 carried in body 12. Concomitantly, base portion 22 of slide member 26 is slidable in an O-ring 52 carried in a skirt portion 54 formed on lower cap 27. An O-ring 56 is carried within a groove formed in skirt portion 54 and along with an upper O-ring 58 functions to prevent leakage between cap 27 and body 12.

Figure 3:
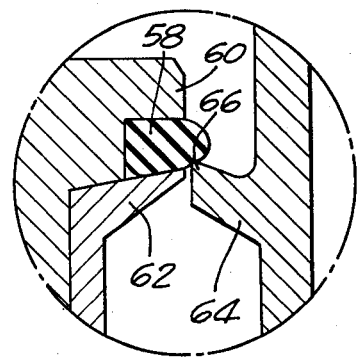
FIG. 3 is an enlarged fragmentary view of a portion of the slide, or port closure member, as it appears in a raised, port closing position blocking the flow of fluid from the inlet passage to the outlet passage of the regulator.

As can be seen by referring to FIGS. 1 and 3, upper O-ring 58, which defines a pressure port means, is normally retained in a compressed configuration between an internal shoulder 60 formed on body 12 and an inturned flange 62 provided at the upper extremity of skirt portion 54 of cap 27.

To cooperate with O-ring 58 to form the port closure means of this embodiment of the invention, there is provided on slide member 16 an intermediate flange 64. Flange 64 is located between flanges 22 and 48 and extends radially outwardly from the main body portion of slide member 16. As best shown in FIG. 3, flange 64 tapers upwardly and outwardly to a thin edge or lip 66. When slide 16 is moved into an upward position against the urging of spring 26 in the manner shown in FIG. 3, lip 66 moves into positive sealable engagement with O-ring 58 and closes the pressure port means.

Laterally projecting outlet, or service passage, 20 of body 12 is internally threaded to receive a first tubular member, or adapter 70. Member 70 has an inboard portion 70a and an outboard portion 70b. Portion 70b is provided with an axial opening 72 adapted to closely receive a second tubular member or sleeve 74. As will presently be discussed in greater detail, the unique fluid diverting means of the invention comprises members 70 and 74 and the novel configuration and arrangement of these members form a highly important feature of the regulator of the present invention.

The open end portion of member 70 is counterbored to form an internal shoulder 76 and sleeve 74 is provided with a flange portion 78. Shoulder 76 and flange portion 78 define an annular channel which receives an O-ring 80 adapted to prevent leakage between the adapter and the sleeve. Similarly, the outlet passage of the device terminates in a tapered shoulder 82 which cooperates with a flange 84 formed on member 70 to define an annular channel within which there is disposed a sealing gasket 86. With the adapter threaded into seating engagement within the outlet passage, gasket 86 prevents leakage between the body and the sleeve member 74.

Referring particularly to FIG. 1, the inboard portion of tubular member 70 has walls 88 tapering outwardly from a first inside diameter A to a second larger inside diameter B. Proximate diameter B a groove 90 is formed in member 70.

Figure 2:
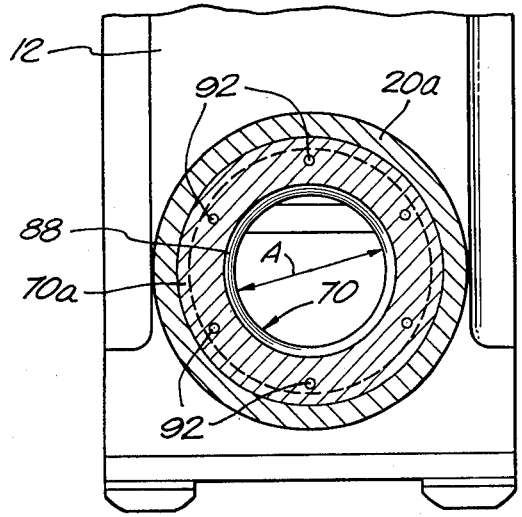
FIG. 2 is a view taken along lines 2—2 of FIG. 1.

As best seen in FIG. 2, member 70 is provided with a plurality of circumferentially spaced apart fluid passageways, or conduits 92, extending substantially parallel to the axis of the outlet passage and to the direction of flow of fluid therethrough. The purpose of these conduits which comprise the second conduit means of the invention, will presently be described.

With sleeve member 74 in position within the outboard portion of member 70, a shoulder 94 formed thereon aligns with groove 90 to form a first annular fluid chamber 95. A second annular fluid chamber 96 is formed at the inboard end of member 70 between said member and body 12. Chamber 96 is in open communication with conduit means 92 and also with fluid pressure chamber, or space 46 by means of a third conduit means 98.

As best illustrated in FIG. 1, when sleeve 74 is in position within the outboard portion of member 70 the inner portion thereof cooperates with tapering walls 88 of member 70 to form a first conduit means or fluid passageway 100. Uniquely, this annular shaped, tapering passageway extends substantially parallel to the longitudinal axis of walls 20a and to the direction of flow of fluid through the outlet passage of the regulator. Due to its location and novel configuration, passageway 100 functions to reliably capture a determinable portion of the fluid flowing through the outlet passage and to effeciently direct it toward fluid pressure chamber 46 through conduits 92 and 98.

In operation the regulator of the invention is interconnected with a source of fluid under a pressure of up to on the order of 5,000 PSI. With the slide member, or poppet 16 in its downward position as shown in FIG. 1, fluid will flow through the pressure port in the direction of the arrows toward the outlet passage 20. As the fluid flows through the outlet passage a predeterminable portion of it will flow into the scoop defined by the annular cavity or throat 100. Due to the unique configuration of this opening and its location directly within the fluid stream, a ram pressure fluid pick-up will be achieved. The fluid under pressure will then be directed through conduits 92 into pressure chamber 46 and will exert an upward force upon the pressure sensing, or lower face of slide member 16. This force will cause the slide member to move upwardly toward a port closing position against the urging of spring 26.

The greater the resistance offered by spring 26 to upward movement of the slide member, the greater will be the fluid pressure required to move the slide member toward the closure port and the higher will be the outlet pressure of the device. Therefore, outlet pressures may be controlled by controlling the strength of the spring 26.

Because of the unique configuration and location of the throat 100, it is to be noted that a slight over pressure will be achieved in the annular fluid chamber 94. This over pressure results in a slight anticipation effect of variations in fluid flow rate which will be reflected in pressure chamber 46. It is this novel effect which contributes to the extremely rapid response time of the device and enables the movement of the slide member to slightly lead the pressure change in the fluid outlet passage.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

We claim:

1. A fluid flow regulator comprising:
   (a) a body having an axial opening and including a fluid inlet passage and an axially spaced fluid outlet passage interconnected with said axial opening;
   (b) pressure port means in said axial opening between said inlet and outlet passages;
   (c) a slide member receivable in said axial opening for axial movement therewithin in response to fluid pressure exerted thereon;
   (d) biasing means operably associated with said slide member for yieldably resisting movement thereof within said axial opening;
   (e) port closure means carried by said slide member for closing said pressure port means upon movement of said slide member within said opening; and
   (f) fluid diverting means disposed within said outlet passage for diverting a portion of the fluid flowing therethrough and directing it toward said slide member, said fluid diverting means comprising a first conduit means defining a fluid flow path substantially parallel to the direction of flow of the fluid within said outlet passageway for capturing a portion of the fluid flowing through said outlet passageway.

2. A fluid flow regulator as defined in claim 1 in which said body includes a base and in which said slide member includes a base which is maintained in a spaced apart relationship with said base of said body defining a fluid pressure chamber therebetween, said fluid pressure chamber being in communication with said conduit means.

3. A fluid flow regulator as defined in claim 2 in which said fluid diverting means comprises a second conduit means in communication with said first conduit means and also in communication with said fluid pressure chamber whereby fluid captured by said first conduit means will flow into said fluid pressure chamber and impinge upon said base of said slide member.

4. A fluid flow regulator as defined in claim 3 in which said fluid diverting means further comprises:
   (a) a first annular fluid chamber in communication with said first and second conduit means; and
   (b) a second annular fluid chamber in communication with said second conduit and said fluid pressure chamber.

5. A fluid flow regulator as defined in claim 4 in which said first conduit means comprises an annular fluid passageway extending substantially parallel to the direction of fluid flow within said outlet passage and in which said second conduit means comprises a plurality of circumferentially spaced apart conduits interconnecting said first and second annular fluid chambers.

6. A fluid flow regulator as defined in claim 1 in which said pressure port comprises a deformable resilient ring and in which said closure means comprises an annular shoulder formed on said slide member which is adapted to sealably engage said ring upon movement of said slide member against the urging of said biasing means.

7. A fluid flow regulator as defined in claim 1 including guide means disposed within said axial opening for locating said biasing means and guiding movement of said slide member within said axial opening.

8. A fluid flow regulator as defined in claim 7 in which said biasing means comprises a bellville spring operably associated with said guide means.

9. A fluid flow regulator comprising:
   (a) a body having a base portion and an axial opening and including a fluid inlet passage and an axially spaced laterally directed fluid outlet interconnected with said axial opening;
   (b) pressure port means in said axial opening between said inlet and outlet passages;
   (c) a slide member receivable in said axial opening for axial movement therewithin in response to fluid pressure exerted thereon; said slide member having a base which is maintained in a spaced apart relationship with said base of said body so as to define a fluid pressure chamber therebetween;

(d) biasing means operably associated with said slide member for yieldably resisting movement thereof within said axial opening;

(e) port closure means carried by said slide member for closing said pressure port means upon movement of said slide member within said opening;

(f) fluid diverting means disposed within said outlet passage for diverting a portion of the fluid flowing therethrough and directing it toward said base of said slide member, said fluid diverting means comprising:

(1) a first conduit means defining a fluid flow path substantially parallel to the direction of flow of the fluid within said outlet passageway for capturing a portion of the fluid flowing through said outlet passageway;

(2) a second conduit means in communication with said first conduit means and also with said fluid pressure chamber, whereby fluid captured by said first conduit means will flow into said fluid pressure chamber and impinge upon said base of said slide member.

10. A fluid flow regulator as defined in claim 9 in which said first conduit means comprises an elongated, tapering generally annular shaped fluid passageway extending in a direction substantially parallel with the direction of fluid flow through said outlet passage.

11. A fluid flow regulator as defined in claim 9 in which said fluid diverting means comprises:

(a) a first tubular member sealably carried within said fluid outlet passage, said first member having an inboard portion and an outboard portion, said inboard portion being defined by walls tapering from a first diameter to a second larger diameter including a plurality of fluid passageways in communication with said fluid pressure chamber; and (b) a second tubular member sealably carried within said outboard portion of said first tubular member, said second tubular member cooperating with said tapered walls of said first tubular member to form said first conduit means.

12. A fluid flow regulator comprising:

(a) a body having side walls defining an axial opening including a fluid inlet passage and an axially spaced fluid outlet passage in communication with said axial opening, said side walls having a shoulder formed intermediate their ends;

(b) a first cap means for sealably closing one end of said axial opening, said first cap means having a base portion and an interconnected generally cylindrical body portion receivable in said axial opening, said body portion terminating in a radially inwardly extending flange;

(c) a second cap means for sealably closing the opposite end of said axial opening, said second cap means having a base portion and an interconnected generally cylindrical body portion receivable in said axial opening;

(d) pressure port means in said axial opening between said inlet and outlet passages, said means comprising a resilient ring disposed between said flange of said first closure means and said shoulder formed on said side walls of said body, said ring being under compression whereby a portion thereof extends into said axial opening;

(e) a slide member receivable in said axial opening having a base portion disposed in a spaced apart relationship with said base of said first cap means and a generally cylindrical shaped axially extending body portion, said slide member being movable within said axial opening in response to fluid pressure exerted on said base portion thereof;

(f) biasing means operably associated with said slide member for yieldably resisting movement of said slide member within said axial opening;

(g) port closure means carried by said slide member for closing said port upon movement of said slide member within said opening, said closure means comprising an annular shoulder formed on said body portion of said slide member and adapted to sealably engage said resilient ring upon movement of said slide member within said axial opening against the urging of said biasing means;

(h) diverting means disposed within said fluid outlet passage for diverting a portion of the fluid flowing therethrough and directing it toward said base of said slide member, said diverting means comprising:

(1) a first tubular member sealably carried within said fluid outlet passage, said first member having an annular groove and including an inboard portion and an outboard portion, said inboard portion being defined by walls tapering outwardly from a first inside diverter to a second larger inside diverter located proximate said groove, said first member further including a plurality of fluid passageways interconnecting said groove with said space between said base of said first cap means and said base of said slide member; and (2) a second tubular member sealably carried within said outboard portion of said first tubular member, said second tubular member cooperating with said tapered walls of said first tubular member to define a fluid passageway extending substantially parallel to the axis of said outlet passageway.

* * * * *